(No Model.)

W. H. WILSON.
FAMILY UTENSIL.

No. 269,767. Patented Dec. 26, 1882.

WITNESSES
Fred Harris
H. L. Fogg.

INVENTOR
William Henry Wilson
by his Attorneys.
Clarke Raymond Parker.

UNITED STATES PATENT OFFICE.

WILLIAM H. WILSON, OF FALL RIVER, MASSACHUSETTS.

FAMILY UTENSIL.

SPECIFICATION forming part of Letters Patent No. 269,767, dated December 26, 1882.

Application filed November 15, 1882. (No model.)

*To all whom it may concern:*

Be it known that I, WILLIAM HENRY WILSON, of Fall River, in the county of Bristol and State of Massachusetts, a citizen of the United States, have invented a new and useful Improvement in a Family Utensil, of which the following is a full, clear, and exact description, reference being had to the accompanying drawings, in which like letters indicate corresponding parts.

The utensil which is the subject of this invention consists of an article designed for family use, and which can be applied to a large number of different purposes in and about the house. Its particular uses are as a stove-lifter, a pie-lifter, a kettle or pot lifter, a hose-wrench, a common wrench, and a can-opener.

Figure 1:
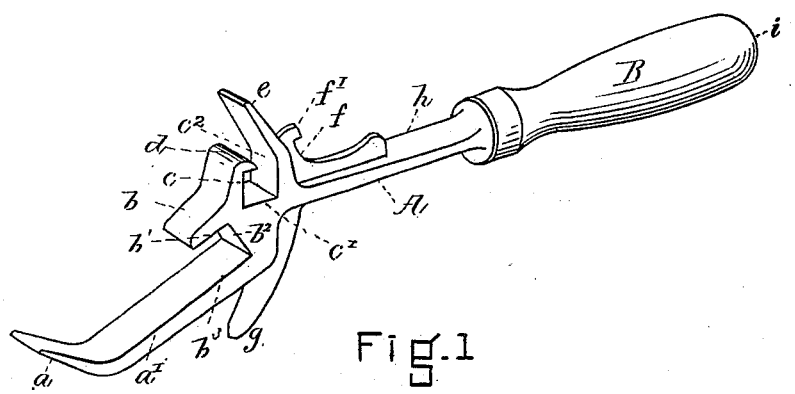
Figure 2:
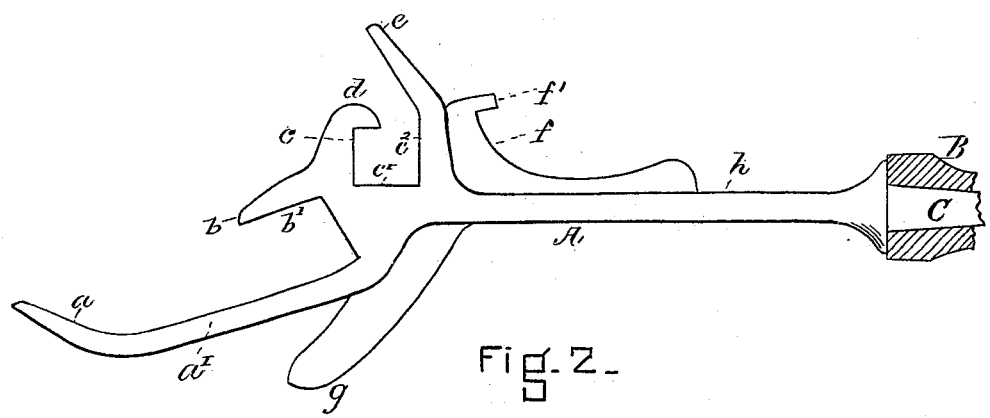

Figure 1 is a perspective view of my invention. Fig. 2 is a side view of the same.

The utensil itself is indicated by A, and is preferably made of cast-iron, and is provided with a tang, to which is secured a handle, B, preferably of wood. As a stove-lifter the part $a$ can be used for removing lids and similar articles from the stove, and it being placed at the extreme end of the projection $a'$ allows the handle B to be removed a considerable distance from the heat of the stove, by which means it does not become heated, like the ordinary stove handle or lifter. In removing plates, or as a pie-lift, the tang $a'$ is placed under the plate, while the top edge of the same is seized by the small projection $b$. On account of the extreme length of the projection $a'$, this will take up the largest plate as well as the smallest with ease. Upon the opposite side another projection is formed. (Indicated by $d$.) With this kettles, pots, and other cooking utensils can be readily taken up by the bail and removed from the stove. The projection $e$ can also conveniently be used as a screw-driver. The projection $f$ is also formed upon the same side, extending upon the side of the shank $h$, with a small projection, $f'$, which is designed to be used as a house hose-wrench for securing and removing hose-couplings from each other. The form of the projections $a'$ $b$ $d$ $e$ are made at the base rectangular upon three sides, by which means I form two independent wrenches, by which different-sized bolts or nuts can be turned by the aid of the faces $b'$ $b^2$ $b^3$ and $c$ $c'$ $c^2$. Upon the opposite side from the hose-wrench I place another projection. (Indicated by $g$.) This is preferably of steel, and is secured in any convenient manner to the iron utensil. This is made sharp upon the extreme end, and is designed for opening cans and similar articles.

I am aware that various combination utensils have been made before; but in order to accomplish what mine will it has been found necessary to make it wholly of iron or metal, so that the part designed for a handle might be used in some one or more of the various operations for which the utensil was intended. This is objectionable, for when the utensil is not in use it is usually placed near the stove, or the part $a$ is inserted in a stove-lid, and thus the handle or opposite end becomes heated and difficult to handle. Again, the handle end, if formed so that it can be used as a utensil, becomes dirty and untidy to use in the ordinary ways intended.

Of course I could insert in the end of the wood handle B, at $i$, a metal screw-driver, which might not interfere materially with the operation of the utensil; but as the part $e$ answers very conveniently for that purpose it is preferably omitted.

Having now described fully my invention, what I claim, and desire to secure by Letters Patent of the United States, is—

1. A family utensil consisting of the metal shank $h$, provided with a tang or other suitable means of securing it to the handle B, with the projections $a$ $a'$ $b$ $d$ $e$ $f$ $f'$, and knife $g$, substantially as and for the purposes set forth.

2. In a family utensil, the projections $a'$ and $b$, formed in connection with the utensil, the wrench having the sides $b'$ $b^2$ $b^3$, as and for the purposes specified.

3. In a family utensil, the shank $h$ and the projections $d$ and $e$, forming the wrench having the sides $c$ $c'$ $c^2$, substantially as and for the purposes specified.

4. In a family utensil, the combination of the shank $h$, projection $a'$, and knife $g$, suitably attached to the shank or projection, as and for the purposes specified.

5. The combination, in a family utensil, of a stove-lift and screw-driver, a hose-wrench and kettle-holder, two nut-wrenches, and a can-opener, all located or formed upon one end of the single shank $h$, substantially as and for the purposes described.

WILLIAM H. WILSON.

Witnesses:
ICHABOD B. BURT,
A. E. RICH.